May 20, 1958  R. H. DAVIES  2,835,507
AXLE MOUNTING FOR A VEHICLE
Filed June 7, 1955  5 Sheets-Sheet 1
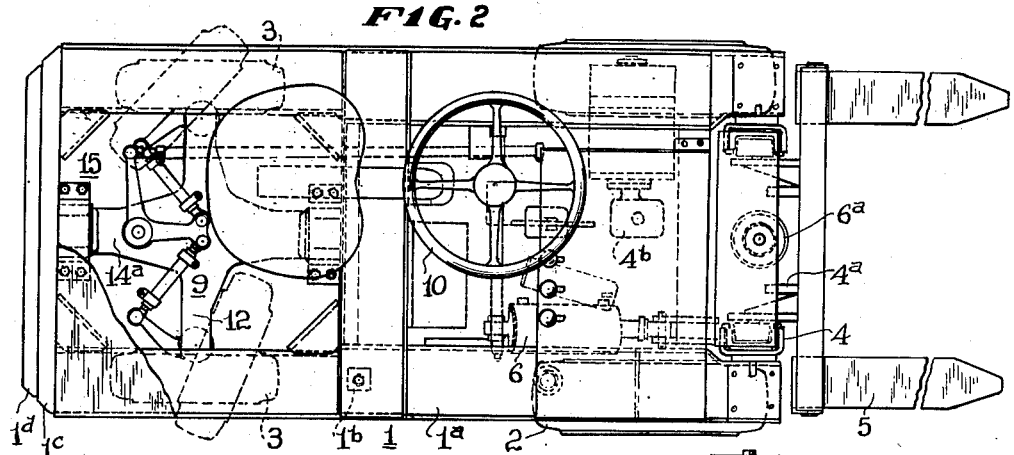
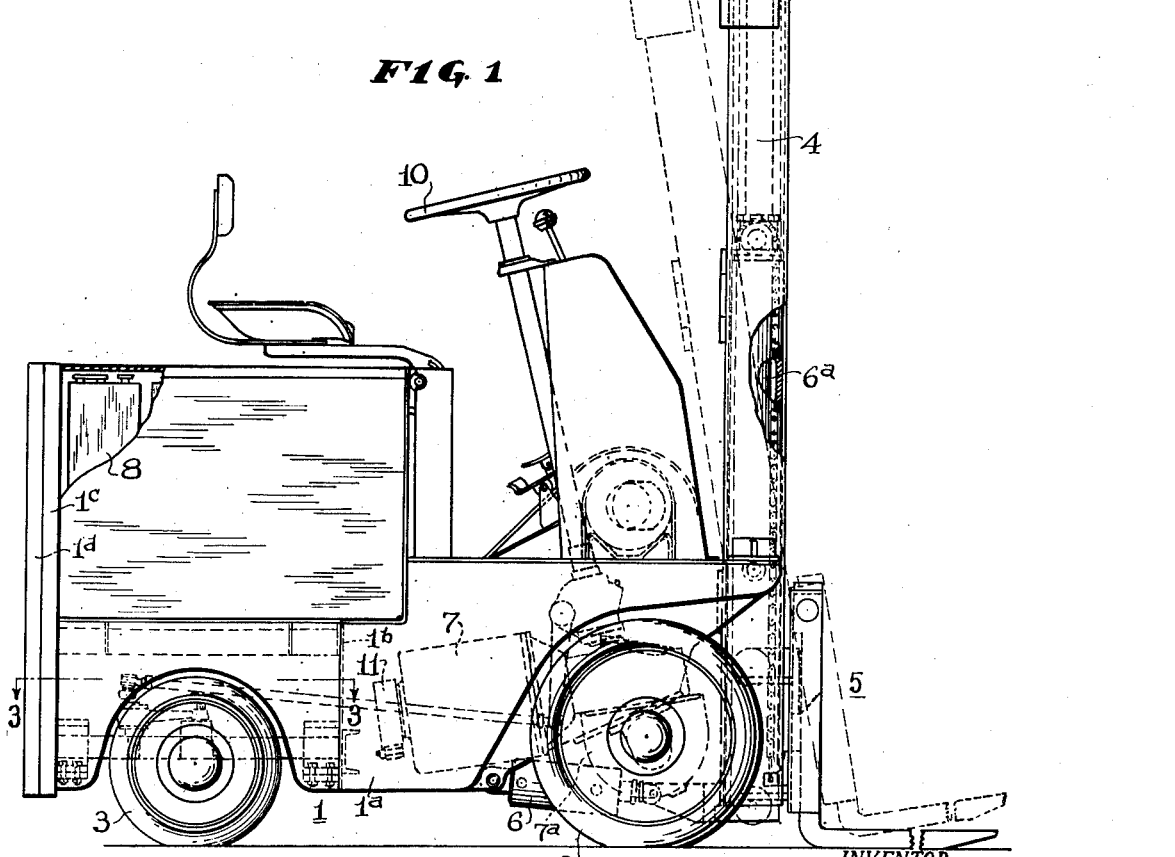
INVENTOR.
ROBERT H. DAVIES.
BY
ATTORNEY

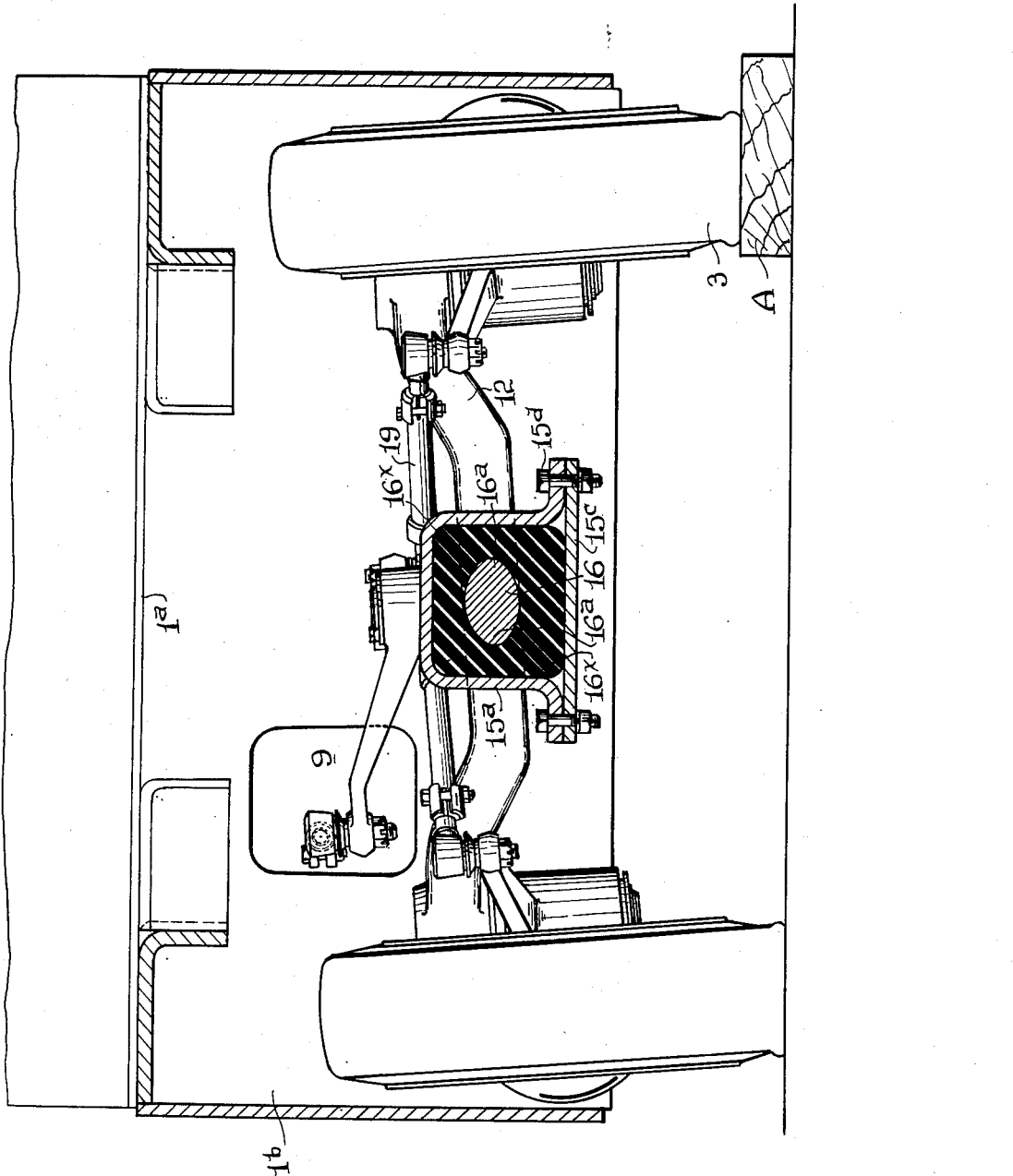

United States Patent Office 2,835,507
Patented May 20, 1958

2,835,507

AXLE MOUNTING FOR A VEHICLE

Robert H. Davies, Kalamazoo, Mich., assignor, by mesne assignments, to Otis Elevator Company, New York, N. Y., a corporation of New Jersey Application June 7, 1955, Serial No. 513,655

2 Claims. (Cl. 280—112)

This invention relates to an industrial truck, more particularly to the supporting means for the truck chassis adapted to minimize tilting, deflection and jolting of the chassis transversely and/or longitudinally and relieve undue stresses on the chassis, during truck travel and thereby prevent unstabilized conditions to exist when the truck wheels or other type of road engaging members are traversing rough or uneven conditions in a road or other surface, such as holes and ruts therein and railroad tracks and other obstructions thereon. The invention is applicable to various other types of vehicles, whether power driven or otherwise translated, particularly vehicles for transporting heavy loads, loads insecurely positioned on the chassis and materials of a perishable or breakable character. The invention is shown embodied in an industrial truck of the elevating type as in this form of truck construction, during transportation or maneuvering thereof, the load is in an elevated position and in many instances it is piled to a considerable height on the elevating member of the truck, so that danger of displacement of the load must be eliminated.

The principal object of the present invention is the provision of a new and improved industrial truck, or similar vehicle for transporting loads, having a chassis, a pair of wheels for supporting the chassis, and a rear axle assembly resiliently interconnecting the wheels and the chassis, the rear axle assembly including a member extending transversely of the chassis for supporting the wheels and being so constructed and arranged that the member connecting the wheels may swing about an axis extending longitudinally of the chassis when one of the wheels passes over an obstruction and so that the wheel on the ground will be lifted from the ground if the member connecting the wheels is swing sufficiently about the beforementioned longitudinal axis.

Another object of the present invention is the provision of a new and improved industrial truck having a chassis, a pair of wheels, and an axle assembly for interconnecting the wheels and the chassis comprising a member extending transversely of the chassis for connecting the wheels and having a longitudinally extending member connected thereto intermediate its ends with portions thereof extending forwardly and rearwardly of the transverse member, and resilient supports for the outer end of the forwardly and rearwardly extending portions which permit swinging movement of the wheels about the longitudinal axis of the longitudinal member, the resilient supports and the outer ends of the portions being so constructed and arranged that when a wheel passes over an obstruction and the transverse member and the wheel are swung about the axis of the longitudinal member, the resilient mounting is compressed with the additional force necessary to additionally compress the mounting a given amount increasing in proportion to the movement of the transverse member from the horizontal, the compressive force tending to return the transverse member and the wheel to their original position with the transverse member horizontal.

A further object of the invention is to provide, in a vehicle, an improved mounting between the chassis and the axle for one pair of wheels for the vehicle to permit relative movement of the wheels when either one is traversing uneven surfaces during truck travel, the axle having intermediate its ends forwardly and rearwardly extending supporting members and the chassis having seats formed of yieldable material and engaging the members under pressure to permit endwise movement thereof and having non-rotative engagement with the support members.

Other objects of the invention will be apparent to those skilled in the art to which my invention relates from the following description taken in connection with the accompanying drawings, wherein:

Fig. 1 is a side elevation of a vehicle embodying my invention;

Fig. 2 is a plan view;

Fig. 6 is a section similar to Fig. 4, but showing the position of the parts when one wheel is riding an obstruction.

Figure 3:
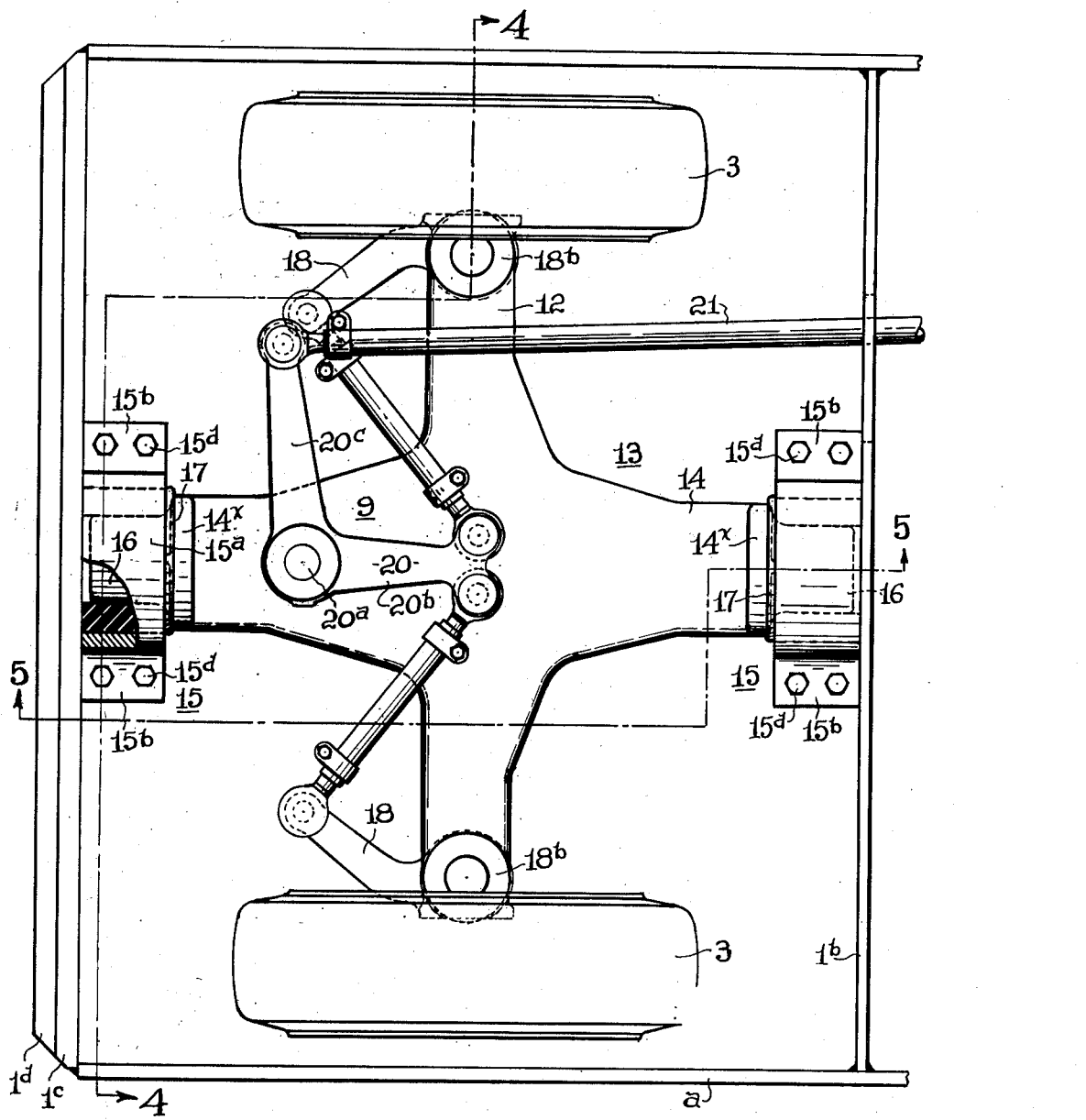
Fig. 3 is a fragmentary plan view (enlarged) on the line 3—3 of Figs. 1 and 4.

In the drawings, 1 indicates as an entirety a vehicle having a chassis 1a mounted on front wheels 2 and rear wheels 3. The chassis 1a is provided with an intermediate transverse wall 1b and a transverse rear wall 1c, which is reinforced by a bumper plate 1d. For illustrative purposes, the vehicle consists of an industrial truck having tiltable guides 4 for an elevating member 4a on which a load carrier 5 is mounted. The tilting of the guides 4 and raising of the elevating member 4a are effected by a fluid medium supplied under pressure by a motor driven pump 4b to fluid operated mechanisms 6, 6a, respectively. In this illustrated form of vehicle 1 (a) the front wheels are driven by a motor 7 through a suitable transmission 7a, the motor being supplied with current from a suitable source, such as batteries 8 and (b) the rear wheels 3 are steerable through operating connections, indicated as an entirety at 9, by a device, such as a wheel 10. The brake mechanism indicated at 11, current supply to the motors and the operation of the fluid operated mechanisms are controlled by suitable manually operated devices, as required in vehicles of this type.

It will be understood that the parts and mechanisms on the chassis above referred to and the manually operated devices form no part of the present invention and therefore each thereof may be variously constructed, assembled and mounted on the chassis or omitted to meet any specified requirements, dependent upon the type of vehicle employed and other factors. In addition, the rear wheels may be driven and the front wheels mounted to effect steering and in either arrangement the driven wheels may be mounted to effect steering, when desired.

In the present disclosure, the wheels 3 are dirigibly mounted in a well known manner on the opposite ends of an axle 12, which in turn is mounted on the chassis 1a for swinging movement in a plane transverse to the chassis, as later set forth, so that the wheels 3 may traverse uneven surfaces during truck travel. As the mounting between the axle 12 and chassis 1a is disposed in a vertical plane containing the longitudinal axis of the chassis, when either wheel 3 rides an uneven surface, for example, an obstruction A (Fig. 6), during truck travel, the axle swings in a transverse plane relative to the chassis, so that stresses on the chassis are reduced to a minimum and traction between the wheels 2 and road or other surface is not affected.

The mounting for the axle 12, indicated as an entirety at 13, comprises alined supporting members 14, 14a, preferably integral with the axle 12, disposed intermediate the ends thereof and extending forwardly and rearwardly of the axle substantially in the plane thereof. Each member 14, 14a, is provided with an abutment means or collar 14x (preferably integral therewith) and the end portion 16 of each member, outwardly of the adjacent collar 14x, is mounted in a support, indicated as an entirety at 15, the support 15 for the member 14 being mounted on the wall 1b and the support 15 for the member 14a being mounted on the wall 1c. The supports 15, are similar in construction and operation, so that only one thereof will be referred to, corresponding parts in both supports being identified by the same reference characters. Each support 15 includes a casing 15a having an inverted U-shaped cross section with the sides of the casing terminating at their lower ends in outwardly turned flanges 15b. The inner ends of the side walls of each casing 15a are fixed to the adjacent transverse chassis wall, the latter serves as the inner end wall of the casing. A plate 15c forms the bottom wall of the casing 15a, the opposite end portions of the plate being secured to the flanges 15b by bolts 15d. A resilient seat member 15e receives the end portion 16 of the adjacent axle supporting member and is mounted in the casing 15a. The seat member 15e is formed with a central inwardly extending opening 15e' into which the adjacent end portion 16 extends. The end portion 16 is provided on opposite sides thereof with lateral extensions 16a. By preference the extensions on the end portion 16 are provided by making the latter of substantially elliptical or oval shape in cross section, and the opening 15e' of complementary shape in cross section to prevent rotation of the received end portion 16 therein, and the casings 15a are supported on the walls 1b, 1c.

Figure 4:
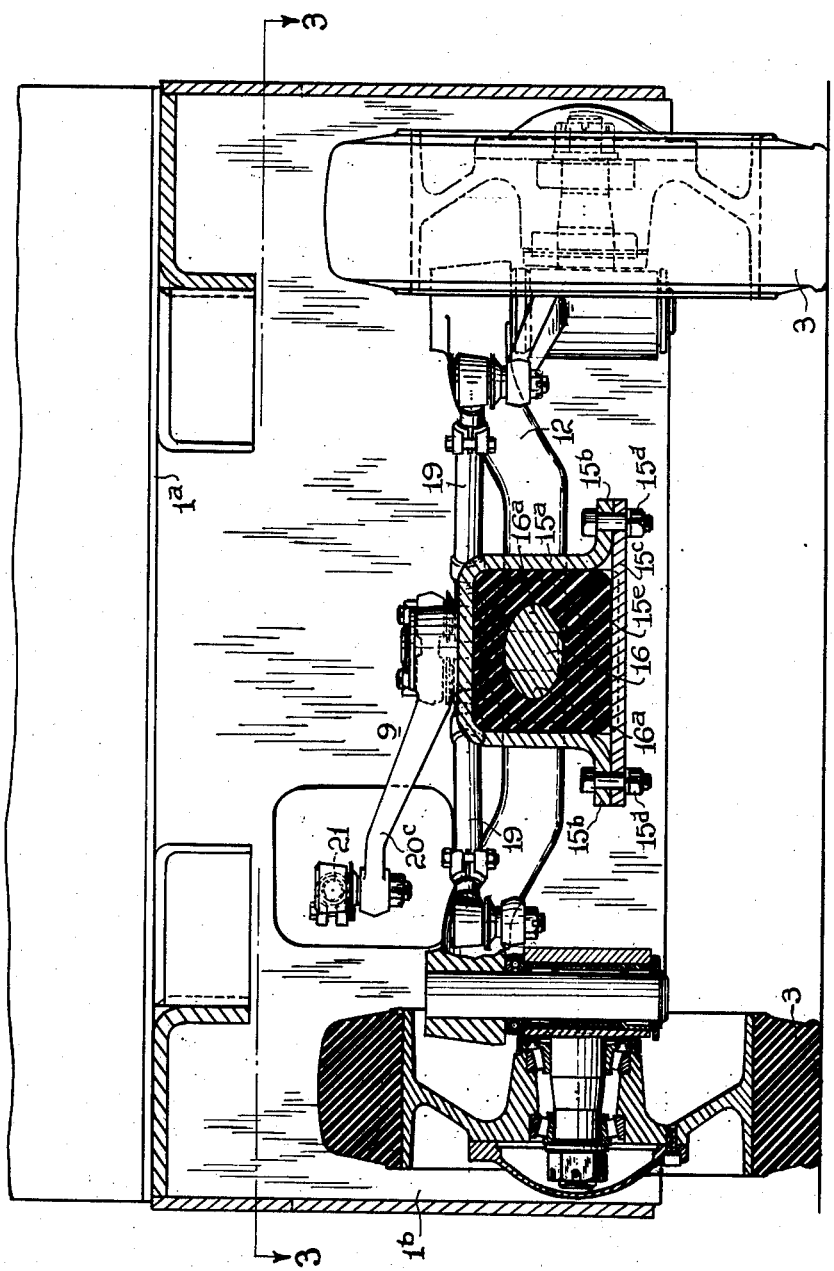
Fig. 4 is a section on the line 4—4 of Fig. 3.
Figure 5:
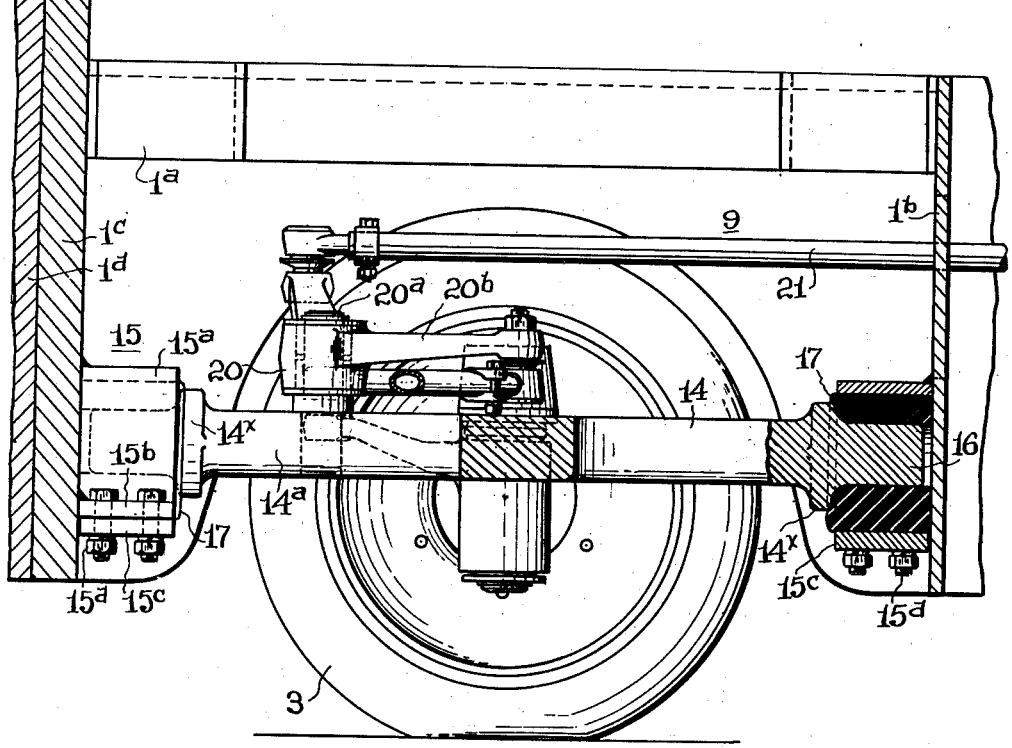
Fig. 5 is a section on the line 5—5 of Fig. 3.

Each seat member 15e is formed of a compressible resilient or elastic material, such as rubber or a compound containing rubber, and has a length substantially equal to the width of the enclosing casing 15a. The exterior contour of the seat members approximates the shape of the enclosing casings but is somewhat larger than the area within and defined by the walls of the enclosing casing 15a and the plate 15c secured thereto, so that when the seat member is initially positioned in the casing 15a, its lower wall extends below the flanges 15b, as shown in dotted lines in Fig. 4. Accordingly, when the plate 15c is clamped in position by the bolts 15d the material of the walls of the seat member 15e is compressed between the inner surfaces of the walls of casing 15a, plate 15c and adjacent transverse wall and the peripheral surface of the end portion 16 and the resilient material along the outer ends of these walls is expanded outwardly around the end portion 16 into engagement with the adjacent collar 14x, as shown at 17 to form a cushion between the collar of the adjacent axle supporting member and the outer end edges of the wall 15a and plate 15c to absorb stresses on the axle 12 transmitted endwise outwardly of the adjacent supporting member. The material forming the seat members 15e is under compression and in engagement with the entire peripheral surfaces of the end portions 16.

The end portions 16 which have lateral extensions 16a are supported and yieldably maintained in a position, in the preferred embodiment, where the extensions 16a are substantially horizontal during truck travel over substantially smooth road or other surfaces. However, when one wheel 3 rides an obstruction, as shown in Fig. 6, the axle bodily swings upwardly relatively to the other wheel 3, but as the axle end portions 16 are fixed to the axle and are non-rotatively connected to the walls of the seats 15e'; these walls of seat members 15e will yield to the pressure applied by the surfaces of the extensions 16a (as shown at 16x in Fig. 6) incident to the movement of the end portions 16 with the axle 12, the resistance of the material to the applied pressure increasing in proportion to the upward movement of the axle 12 due to the non-circular or oval-shaped cross section of the end portions and the shape of the casing 15e. It will be noted that as the end portions 16 turn about their axes the lateral extensions 16a compress the resilient material of the seat members 15e against the side walls of the casings 15a to provide a compressive force, in addition to the torsional force, which tends to return the axle 12 and the wheels to their normal position. The additional force necessary to compress the material an additional unit amount increases as the material is compressed and will reach a point on relatively large deflections where the material is no longer compressible. When the pressure in the resilient material due to compression becomes great enough, as on large deflections when the limit of compressibility is approached, the wheel on the ground will lift thereby preventing tipping of the truck and load. Thus it may be said that on small deflections the resilient seat allows comparatively easy rotation but on large deflection offers sufficient resistance which will prevent tipping of the load. Where both wheels 3 simultaneously ride uneven surfaces of equal height or depth, the axle 12 will remain in normal position and where these surfaces are unequal the movement of the axle 12 will be dependent on the relative difference in height or depth thereof.

It will be observed that the elastic walls of the seat members operate to cushion the chassis in all positions of the axle 12, for which reason among others the major axis of each end portion 16 is disposed parallel to the axle 12; also, that the mounting for the axle is materially simplified and eliminates the employment of pivotally connected parts, so that lubrication equipment is not required and danger of rattle is avoided.

The steering connections 9 for the wheels 3 comprise arms 18 extending outwardly and rearwardly from knuckles 18b which are respectively connected to spindles for the wheels 3 in a well known manner. The outer end of each arm 18 is pivotally connected to one end of a link 19. A bell-crank lever 20 is fulcrumed on a stud shaft 20a suitably mounted on the supporting member 14a on an axis disposed in a vertical plane which cuts the axis of the seats. The lever 20 has an arm 20b pivotally connected to the inner ends of links 19 and an arm 20c pivotally connected to a rod 21 operatively connected to the steering wheel 10. When the wheels 3 are in normal or a non-steering position (as shown in Figs. 2 and 3) the arm 20b of the bell-crank 20 extends forwardly of its fulcrum 20a in alinement with the axes of the seat members 15e. The links 19 are of equal length and operation of the bell-crank 20 serves to swing the wheels approximately equal distances to effect steering of the vehicle.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In an industrial truck, the combination of a frame assembly, a pair of wheels, a member extending transversely of said frame assembly and supporting said wheels at its opposite ends, said member having aligned forwardly and rearwardly extending elements intermediate its ends with the outer end portions of the elements being of non-circular cross section, and a resilient mounting for each of said portions connecting said member to said frame assembly and comprising a seat member of resilient material having an opening therein for receiving the corresponding end portion and a casing for the seat member comprised of first and second seperable parts, and means connecting one of said parts to said frame assembly, said seat member and said end portion being substantially non-rotatable with respect to each other and said seat members normally being compressed between said casings and said portions and rotation of said elements about their longitudinal axes further compressing portions of said resilient material between said casings and said end portions.

2. In an industrial truck, the combination of a frame assembly, a pair of wheels, a rigid member extending transversely of said frame assembly and supporting said wheels at its opposite ends, said member having aligned forwardly and rearwardly extending elements intermediate its ends and rigidly connected thereto, the outer portions of said elements being of non-circular cross section, and a resilient mounting for the outer ends of said portions connecting said member to said frame assembly and permitting relative swinging movement between said frame assembly and said member about the axes of said elements, each of said mountings comprising a casing comprised of first and second parts separable along a line extending longitudinally of the casing, a seat member of resilient material under compression intermediate the casing and the end portions and extending inwardly of the inner end of said casing and further compressed by relative movement between said frame assembly and said members about the axis of said elements and abutment means on each of said portions inwardly of said seat members and spaced from said casings, said members extending into engagement with the adjacent abutment means, and means connecting one of said parts of each of said casings to said frame assembly.

References Cited in the file of this patent
UNITED STATES PATENTS

| | | |
|---|---|---|
| 2,242,454 | Cochran | May 20, 1941 |
| 2,344,072 | Winkelman | Mar. 14, 1944 |
| 2,525,988 | Willson | Oct. 17, 1950 |